United States Patent [19]
Sugiyama et al.

[11] 4,082,909
[45] Apr. 4, 1978

[54] RUBBER COMPOSITION CONTAINING METAL SALT OF HYDROXY BENZOIC ACID

[75] Inventors: Yuichi Sugiyama; Hiroyuki Kaido; Tsuneo Koyama, all of Hiratsuka, Japan

[73] Assignee: The Yokohama Rubber Company, Limited, Tokyo, Japan

[21] Appl. No.: 670,758

[22] Filed: Mar. 26, 1976

[30] Foreign Application Priority Data

May 22, 1975 Japan .................................. 50-60199

[51] Int. Cl.$^2$ ............................................... C08K 5/13
[52] U.S. Cl. ........................................ 526/4; 260/709; 428/295; 526/5

[58] Field of Search .................. 260/45.85 B, 19 WA, 260/23.7 R, 23.7 B, 23.7 H, 23.7 M, 709; 526/4, 5, 914; 428/295

[56] References Cited
U.S. PATENT DOCUMENTS

| | | | |
|---|---|---|---|
| 3,514,370 | 5/1970 | Canevari | 526/4 |
| 3,878,150 | 4/1975 | Lohr | 260/23.7 M |
| 3,925,279 | 12/1975 | Horii | 260/23.7 R |
| 3,963,652 | 6/1976 | Tanimura | 260/19 U A |

Primary Examiner—Paul R. Michl
Attorney, Agent, or Firm—Oblon, Fisher, Spivak, McClelland & Maier

[57] ABSTRACT

A rubber composition which comprises a vulcanizable rubber and 0.5 – 20 wt. parts of a metal salt of hydroxy benzoic acid per 100 wt. parts of the rubber. This composition exhibits excellent adhesive bonding to metallic material.

5 Claims, No Drawings

RUBBER COMPOSITION CONTAINING METAL SALT OF HYDROXY BENZOIC ACID

BACKGROUND OF THE INVENTION

1. Field of the Invention

The present invention relates to a rubber composition which is highly adhered to a metallic material by a vulcanization. Heretofore to promote adhesion between a rubber and a metallic material such as a steel cord, it has been known to plate the surface of the metallic material of steel or steel cord with a copper alloy such as brass and bronze. However, the need has increased for high speed, high load and high efficiency of motor car tires and conveyor belts, and driving belts, V-belts, hoses, etc., wherein metallic materials are used as tension members. Accordingly, a high adhesive bond between the rubber and the metallic material is needed. Recently, in order to improve the adhesive bond between a rubber and a metallic material, it has been proposed to add a mixture of a formaldehyde donor, a formaldehyde acceptor and a finely dispersed silica filler (it is called "HRH" system) to the rubber. However, rubber compositions including the HRH system, such as a mixture of fine silica, resorcinol and hexamethylenetetramine, have the disadvantages of generating a smog and bad smell to pollute environment and unsatisfactory workability when blended by a Bambury's mixer or a roller mixer because of the severe sublimation of resorcinol. The rubber compositions have also the disadvantage of unsatisfactory rolling workability because of low scorch safety and the disadvantage of deteriorated adhesive property caused by moisture absorption in the unvulcanized condition.

It has been proposed to add cobalt naphthenate in order to improve the adhesive property between a rubber and a metallic material. However, in said case, there is the disadvantage of deterioration of adhesive property in high temperature blending operation or high temperature vulcanization; (such as 150° - 190° C in the preparation) and also the disadvantage of deterioration of adhesive property and deterioration of other physical properties after heat aging; (such as about 100° C for several tens of hours of driving).

2. Summary of the Invention

It is an object of the present invention to improve the adhesive property between a rubber and a metal metallic material under vulcanization. It is another object of the invention to limit the deterioration of the adhesive bond caused by heat aging and to improve workability at the same time in the preparation of rubber products such as tires, belts and hoses. The objects of the invention have been attained by providing a rubber composition which comprises 0.5 - 20 wt. parts of a metal salt of hydroxybenzoic acid per 100 wt. parts of a rubber. (phr. : weights per hundred rubber).

DETAILED DESCRIPTION OF THE PREFERRED EMBODIMENTS

The inventors have found that the adhesive bond between a rubber and a metallic material has been remarkably improved by adding a metal salt of hydroxybenzoic acid to the rubber. The metal salts of hydroxybenzoic acid used in the invention include anhydrous and hydrated salts of hydroxybenzoic acid salts of Na, K, Mg, Ca, Al, Fe, Sn, Ni, Co, Zn, Cu and the like. The metal salt of hydroxybenzoic acid is added at a ratio of 0.5 - 20 wt. parts per 100 wt. parts of the rubber. (phr.). When it is less than 0.5 wt. phr., the desired effect of the invention is not attained. On the other hand, when it is higher than 20 phr., the disadvantageous phenomena of delay of vulcanization and deterioration of physical properties occur. The optimum amount of the metal salt of hydroxybenzoic acid is dependent upon the type of the rubber, the additives and the metallic material and is usually in a range of 0.5 - 7 phr. for improving the adhesive bonding to the metallic material.

The rubber compositions of the invention have excellent adhesive property to iron, copper, brass, zinc, bronze, aluminum, and the like. The typical rubbers used in the invention include diene-type rubbers such as natural rubber, polyisoprene rubber, polybutadiene rubber, styrenebutadiene copolymer, acrylonitrile-butadiene rubber, chloroprene rubber and mixtures thereof.

The vulcanizing agent used in the invention include the sulfur-vulcanization accelerator-type and the peroxide-type and the like. The vulcanization accelerator can be selected from a wide range of compounds such as sulfenamide-type compounds e.g. N-oxydiethylene benzothiazole sulfenamide; thiazole-type compounds e.g. 2-mercaptobenzothiazole; thiruam-type compounds e.g. tetramethyl thiuramdisulfide and the like.

It is possible to add the other additives such as zinc oxide, stearic acid, carbon black, fine silica (white carbon), depending upon the utility. The vulcanization temperature can be the conventional ones. The conditions of the present invention can be considered in accordance with the prior art such as:

Encyclopedia of Polymer Science and Technology Vol. 12 Pages 161–353 on rubbers; ibid Vol. 14 Pages 42–64 on tires and tire cord; ibid Vol. 8 Pages 184–185 on tire and cord dip; ibid Vol. 14 Pages 740–756 on Vulcanization; and Rubber Chemistry and Technology 46 (4) Pages 981–998 on rubber-to-textile and rubber-to-steel cord adhesion.

The invention will be further illustrated in detail by certain examples.

I. EXAMPLES 1–14; Standard Example 1; and Comparative Examples 1–2

The compositions stated in Table 1 and Table 3 were blended as follows. The test results of the rubber compositions of Examples 1 - 14, Standard Example 1; and Comparative Examples 1 - 2 are stated in Table 2 and Table 4.

Preparation and Vulcanization of Rubber Composition

The components of each master batch were blended by a Bambury's mixer and a vulcanizing agent was blended to the master batch on two roll mill to prepare each rubber composition.

Adhesive Strength Test

1. Adhesive Strength to Metal Material

Brass plated steel cords were arranged in parallel with each gap of 12.5 mm. Each rubber composition was coated from both sides of the steel cords to form each fabricated product in which each cord was embedded for 2 inches and the fabricated product was vulcanized under condition of 150° C-30 min. The pull-out test was carried out in accordance with ASTM D2229, under the following conditions.

1. to cool at a room temperature after vulcanization;

2. to cool at a room temperature after vulcanization and following heat aging at 100° C for 72 hours in a gear oven.

As is clear from the results of Table 2 and Table 4, the physical properties of the vulcanized rubber compositions of the invention are similar to those of the vulcanized rubber composition containing cobalt naphthenate however the adhesive strength to the brass plated steel cord and the retentive coefficient of adhesive strength after hot aging can be remarkably improved.

Table 1

| | Unit: weight part (part by weight) | | | | | | | | |
|---|---|---|---|---|---|---|---|---|---|
| | Exp. 1 | Exp. 2 | Exp. 3 | Exp. 4 | Exp. 5 | Exp. 6 | Exp. 7 | Stand. Exp. 1 | Comp. Exp. 1 |
| (Master Batch) | | | | | | | | | |
| Natural rubber(RSS #1) | 100 | 100 | 100 | 100 | 100 | 100 | 100 | 100 | 100 |
| Zinc oxide (#3) (JISK1410) | 5 | 5 | 5 | 5 | 5 | 5 | 5 | 5 | 5 |
| Stearic acid | 3 | 3 | 3 | 3 | 3 | 3 | 3 | 3 | 3 |
| Carbon black (HAF) | 50 | 50 | 50 | 50 | 50 | 50 | 50 | 50 | 50 |
| Process oil*[1] | 4 | 4 | 4 | 4 | 4 | 4 | 4 | 4 | 4 |
| Cobalt naphthenate | — | — | — | — | — | — | — | — | 3 |
| Cobalt o-hydroxybenzoate | 3 | — | — | — | — | — | — | — | — |
| Sodium p-hydroxybenzoate | — | 3 | — | — | — | — | — | — | — |
| Magnesium p-hydroxybenzoate | — | — | 3 | — | — | — | — | — | — |
| Zinc p-hydroxybenzoate | — | — | — | 3 | — | — | — | — | — |
| Iron p-hydroxybenzoate | — | — | — | — | 3 | — | — | — | — |
| Nickel p-hydroxybenozate | — | — | — | — | — | 3 | — | — | — |
| Cobalt p-hydroxybenzoate | — | — | — | — | — | — | 3 | — | — |
| (Vulcanizing agent) | | | | | | | | | |
| Sulfur | 4 | 4 | 4 | 4 | 4 | 4 | 4 | 4 | 4 |
| N-oxydiethylene-2-benzothiazol sulfenamide | 1 | 1 | 1 | 1 | 1 | 1 | 1 | 1 | 1 |

*[1]Process oil: aromatic type process oil

Table 2

| | Exp. 1 | Exp. 2 | Exp. 3 | Exp. 4 | Exp. 5 | Exp. 6 | Exp. 7 | Stand. Exp. 1 | Comp. Exp. 1 |
|---|---|---|---|---|---|---|---|---|---|
| (Physical properties) | | | | | | | | | |
| Tensile strength (Kg/cm$^2$) | 212 | 218 | 233 | 223 | 227 | 220 | 219 | 212 | 217 |
| Elongation (%) | 390 | 410 | 460 | 415 | 415 | 390 | 415 | 380 | 410 |
| 300% modulus (Kg/cm$^2$) | 156 | 161 | 152 | 158 | 160 | 180 | 158 | 157 | 153 |
| Hardness (Japanese Industrial Standard A) | 71 | 71 | 72 | 71 | 71 | 74 | 72 | 70 | 70 |
| (Adhesive strength) Brass plated steel cord | | | | | | | | | |
| before aging (Kg) | 130 | 138 | 129 | 135 | 130 | 137 | 142 | 85 | 116 |
| after heat aging (Kg) | 88 | 94 | 90 | 89 | 87 | 89 | 102 | 53 | 60 |
| Retentive coefficient (%) | 68 | 68 | 70 | 66 | 67 | 65 | 72 | 62 | 52 |

Table 3

| | Exp. 8 | Exp. 9 | Exp. 10 | Exp. 11 | Exp. 12 | Exp. 13 | Exp. 14 | Stand. Exp. 1 | Comp. Exp. 2 |
|---|---|---|---|---|---|---|---|---|---|
| (Master Batch) | | | | | | | | | |
| Natural rubber (RSS #1) | 100 | 100 | 100 | 100 | 100 | 100 | 100 | 100 | 100 |
| Zinc oxide (#3) (JISK1410) | 5 | 5 | 5 | 5 | 5 | 5 | 5 | 5 | 5 |
| Stearic acid | 3 | 3 | 3 | 3 | 3 | 3 | 3 | 3 | 3 |
| Carbon black (HAF) | 50 | 50 | 50 | 50 | 50 | 50 | 50 | 50 | 50 |
| Process oil | 4 | 4 | 4 | 4 | 4 | 4 | 4 | 4 | 4 |
| Cobalt naphthenate | — | — | — | — | — | — | — | — | 6 |
| Cobalt o-hydroxybenzoate | 6 | — | — | — | — | — | — | — | — |
| Sodium p-hydroxybenzoate | — | 6 | — | — | — | — | — | — | — |
| Magnesium p-hydroxybenzoate | — | — | 6 | — | — | — | — | — | — |
| Zinc p-hyroxybenzoate | — | — | — | 6 | — | — | — | — | — |
| Iron p-hydroxybenzoate | — | — | — | — | 6 | — | — | — | — |
| Nickel p-hydroxybenzoate | — | — | — | — | — | 6 | — | — | — |
| Cobalt p-hydroxybenzoate | — | — | — | — | — | — | 6 | — | — |
| (Vulcanizing agent) | | | | | | | | | |
| Sulfur | 4 | 4 | 4 | 4 | 4 | 4 | 4 | 4 | 4 |
| N-oxydiethylene-2-benzothiazol sulfenamide | 1 | 1 | 1 | 1 | 1 | 1 | 1 | 1 | 1 |

Table 4

| | Exp. 8 | Exp. 9 | Exp. 10 | Exp. 11 | Exp. 12 | Exp. 13 | Exp. 14 | Stand. Exp. 1 | Comp. Exp. 2 |
|---|---|---|---|---|---|---|---|---|---|
| (Physical properties) | | | | | | | | | |
| Tensile strength (Kg/cm$^2$) | 209 | 200 | 212 | 210 | 215 | 205 | 210 | 212 | 200 |
| Elongation (%) | 390 | 370 | 440 | 430 | 415 | 360 | 420 | 380 | 390 |
| 300% modulus (Kg/cm$^2$) | 155 | 158 | 150 | 153 | 153 | 175 | 153 | 157 | 148 |
| Hardness (Japanese Industrial Standard A) | 72 | 74 | 72 | 71 | 70 | 74 | 72 | 70 | 70 |
| (Adhesive strength) Brass plated steel cord | | | | | | | | | |

Table 4-continued

|  | Exp. 8 | Exp. 9 | Exp. 10 | Exp. 11 | Exp. 12 | Exp. 13 | Exp. 14 | Stand. Exp. 1 | Comp. Exp. 2 |
|---|---|---|---|---|---|---|---|---|---|
| before aging (Kg) | 127 | 144 | 133 | 130 | 152 | 128 | 160 | 85 | 126 |
| after heat aging (Kg) | 82 | 97 | 92 | 86 | 102 | 85 | 112 | 53 | 64 |
| Retentive coefficient (%) | 65 | 67 | 69 | 66 | 69 | 66 | 70 | 62 | 51 |

II. EXAMPLES 15–23; Standard Example 2 and Comparative Examples 3–5

In accordance with the process of (I), the compositions stated in Table 5 were blended, vulcanized and the physical properties of the products were measured. The test results are shown in Table 6. As it is clear from the results of Table 6, the physical properties especially tensile strength under 300% elongation of the vulcanized rubber compositions of the invention were remarkably improved comparing with those of the vulcanized rubber composition containing cobalt naphthenate. The adhesive strengths to the zinc plated steel cord and the nonplated steel cord of the vulcanized rubber compositions of the invention were remarkably improved by the addition of the metal salts of hydroxybenzoic acid especially cobalt salt of p-hydroxybenzoic acid. The retentive coefficient of adhesive strength after heat aging were also remarkably improved.

processability when compared with rubber compositions containing cobalt naphthenate. Accordingly, the rubber compositions of the invention can be utilized as an adhesive composition for rubber which is bonded to a metallic material.

We claim:

1. A vulcanized rubber product reinforced with metallic cords which comprises rubber composition comprising 0.5 – 20 wt. parts of a metal salt of hydroxybenzoic acid per 100 wt. parts of a rubber.

2. The vulcanized rubber product reinforced with metallic cords of claim 1 wherein said metallic cords are copper alloy coated steel tire cords.

3. The vulcanized rubber product reinforced with metallic cords of claim 1 wherein said metal salt of hydroxybenzoic acid is selected from the group consisting of Na, K, Mg, Ca, Al, Fe, Sn, Ni, Co, Zn, and Cu salts of hydroxybenzoic acid.

4. The vulcanized rubber product reinforced with

Table 5

|  | Exp. 15 | Exp. 16 | Exp. 17 | Exp. 18 | Exp. 19 | Exp. 20 | Exp. 21 | Exp. 22 | Exp. 23 | Stand. Exp. 1 | Comp. Exp. 3 | Comp. Exp. 4 | Comp. Exp. 5 |
|---|---|---|---|---|---|---|---|---|---|---|---|---|---|
| (Master Batch) | | | | | | | | | | | | | |
| Natural rubber(RSS #1) | 100 | 100 | 100 | 100 | 100 | 100 | 100 | 100 | 100 | 100 | 100 | 100 | 100 |
| Zinc oxide (#3) (JISK1410) | 5 | 5 | 5 | 5 | 5 | 5 | 5 | 5 | 5 | 5 | 5 | 5 | 5 |
| Stearic acid | 3 | 3 | 3 | 3 | 3 | 3 | 3 | 3 | 3 | 3 | 3 | 3 | 3 |
| Carbon black(HAF) | 50 | 50 | 50 | 50 | 50 | 50 | 50 | 50 | 50 | 50 | 50 | 50 | 50 |
| Process oil | 4 | 4 | 4 | 4 | 4 | 4 | 4 | 4 | 4 | 4 | 4 | 4 | 4 |
| Cobalt naphthenate | — | — | — | — | — | — | — | — | — | — | 4 | 7 | 10 |
| Cobalt o-hydroxybenzoate | 4 | 7 | 10 | — | — | — | — | — | — | — | — | — | — |
| Nickel p-hydroxybenzoate | — | — | — | 4 | 7 | 10 | — | — | — | — | — | — | — |
| Cobalt p-hydroxybenzoate | — | — | — | — | — | — | 4 | 7 | 10 | — | — | — | — |
| (Vulcanizing agent) | | | | | | | | | | | | | |
| Sulfur | 4 | 4 | 4 | 4 | 4 | 4 | 4 | 4 | 4 | 4 | 4 | 4 | 4 |
| N-oxydiethylene-2-benzothiazol sulfenamide | 1 | 1 | 1 | 1 | 1 | 1 | 1 | 1 | 1 | 1 | 1 | 1 | 1 |

Table 6

|  | Exp. 15 | Exp. 16 | Exp. 17 | Exp. 18 | Exp. 19 | Exp. 20 | Exp. 21 | Exp. 22 | Exp. 23 | Stand. Exp. 1 | Comp. Exp. 3 | Comp. Exp. 4 | Comp. Exp. 5 |
|---|---|---|---|---|---|---|---|---|---|---|---|---|---|
| (Physical properties) | | | | | | | | | | | | | |
| Tensile strength(Kg/cm$^2$) | 210 | 206 | 189 | 220 | 211 | 200 | 227 | 222 | 207 | 212 | 225 | 220 | 212 |
| Elongation (%) | 400 | 390 | 370 | 400 | 380 | 360 | 420 | 420 | 400 | 380 | 430 | 450 | 470 |
| 300% modulus (Kg/cm$^2$) | 156 | 154 | 155 | 177 | 172 | 157 | 157 | 143 | 140 | 157 | 152 | 141 | 125 |
| Hardness (Japanese Industrial Standard A) | 71 | 72 | 72 | 70 | 72 | 71 | 69 | 70 | 71 | 70 | 69 | 68 | 68 |
| (Adhesive strength) | | | | | | | | | | | | | |
| Zinc plated steel cord | | | | | | | | | | | | | |
| before aging (Kg) | 132 | 72 | 65 | 95 | 84 | 90 | 154 | 144 | 112 | 20 | 110 | 64 | 60 |
| after heat aging (Kg) | 84 | 43 | 33 | 65 | 58 | 59 | 108 | 101 | 75 | 13 | 56 | 31 | 27 |
| Retentive coefficient (%) | 64 | 60 | 51 | 68 | 69 | 66 | 70 | 70 | 67 | 65 | 51 | 48 | 45 |
| Steel cord (non-plated) | | | | | | | | | | | | | |
| before aging (Kg) | 36 | 38 | 42 | 44 | 42 | 54 | 44 | 56 | 58 | 24 | 36 | 38 | 40 |
| after heat aging (Kg) | 25 | 26 | 27 | 31 | 29 | 36 | 33 | 40 | 41 | 15 | 19 | 19 | 20 |
| Retentive coefficient (%) | 69 | 69 | 65 | 70 | 70 | 67 | 75 | 72 | 70 | 63 | 53 | 50 | 61 |

As stated above, the rubber compositions of the invention attain a remarkably high adhesive bond to the metallic material and prevent deterioration of adhesive bond caused by heat aging. The rubber compositions can be blended at high temperatures (hot blending) and vulcanized at high temperature (hot curing) to improve metallic cords of claim 1 wherein said metal salt of hydroxybenzoic acid is cobalt hydroxybenzoate.

5. The vulcanized rubber product reinforced with metallic cords of claim 1 wherein said metal salt of hydroxybenzoic acid is nickel hydroxybenzoate.

* * * * *